United States Patent Office 3,490,341
Patented Jan. 20, 1970

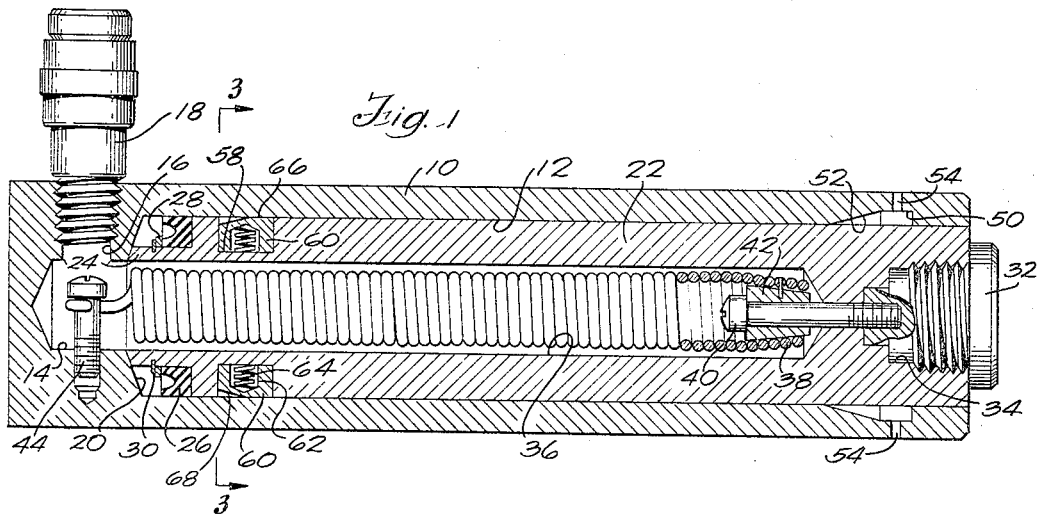

3,490,341
HYDRAULIC RAM
Donald W. Sessody, Milwaukee, Wis., assignor to Applied Power Industries, Inc., Milwaukee, Wis., a corporation of Wisconsin
Filed Mar. 27, 1968 Ser. No. 716,460
Int. Cl. F01f 31/00; F15f 15/26; F16i 15/18
U.S. Cl. 92—30                                    6 Claims

ABSTRACT OF THE DISCLOSURE

A fluid actuated cylinder-piston unit wherein the cylinder is formed with an annular recess and the piston is provided with an expandable split ring cooperable with the recess to form a positive limit stop.

BACKGROUND OF THE INVENTION

It is common practice to provide force applying devices in the nature of a hydraulic ram consisting generally of a cylinder having a bore for receiving an extendable piston. The bore of the cylinder provides a displacement chamber for the admission of pressurized fluid, and upon energization of the device under the control of an operator, the piston is extended to perform its desired work as by application of force.

Such devices may take the form of a single-acting ram wherein fluid pressure acts on the piston only to extend the same, the piston being retractable as by spring means. Alternatively, these hydraulic power devices may be in the nature of a double-acting ram wherein fluid pressure is used to reciprocate the piston in both its outward stroke and its return stroke. In either case, it is necessary to provide some means for limiting the stroke of the piston so that it does not leave the bore of the cylinder upon extension thereof.

In most instances, the limit stop for the piston in these hydraulic ram devices has heretofore been provided through use of a stop ring threaded or otherwise secured within the open end of the cylinder bore. The stop ring thus provided had an inner diameter somewhat less than that of the bore to snugly but slidably embrace the piston which carried an annular abutment on its inner end snugly but slidably received in the cylinder bore, the abutment being cooperable with the stop ring upon extension of the piston to limit outward movement thereof.

While such prior limit stops were effective for their intended purpose, they required careful and accurate machining of the stop ring, piston stop abutment, and various other attendant parts. In addition, special precautions were necessary in providing effective seals, and various types of special sealing devices have been resorted to in efforts to reduce leakage. Furthermore, these prior devices have necessitated careful time-consuming assembly operations, and above all, the stop ring and piston abutment provided only a two-point bearing for the piston which would thus be adversely affected by eccentric loading.

While some efforts have been made to find satisfactory substitutes for the most commonly used piston limit stops thus described, these substitute devices have not received popular acceptance for various reasons. For the most part, the stop means proposed have been overly complicated and costly to machine and assemble with an undesirable number of moving parts being subject to malfunction, thus requiring replacement or repair. Also, in most instances, the need for special sealing devices has not been eliminated, nor have the disadvantages attendant eccentric loading been entirely obviated.

SUMMARY

The present invention contemplates the provision of a hydraulic or fluid actuated ram assemblage which embodies an improved travel limiting stop for the piston which obviates the disadvantages and objections attendant prior devices of this type.

An important object of this invention is to provide an improved cam stop device for limiting travel of the piston of a fluid actuated ram which permits use of a piston having a constant single diameter cooperable with a uniform and constant diameter cylinder bore to thereby provide a complete bearing between the inside diameter of the cylinder body and the outside diameter of the plunger or piston throughout the entire length of the bore or pressure cavity.

Another object of the invention is to provide an improved hydraulic ram assemblage embodying an automatically operable cam type piston limit stop and which is extremely simple, compact and durable in construction, and which is moreover highly efficient, versatile and dependent in operation.

These and other objects and advantages of the present invention will become apparent from the following detailed description.

THE DRAWINGS

A clear conception of the invention and of the mode of operation of a typical single acting hydraulic ram device embodying the improvements may be had by referring to the drawing accompanying and forming a part of this specification, wherein like reference characters designate the same or similar parts in the several views.

FIGURE 1 is a longitudinal section through a typical hydraulic power device embodying the invention and showing the piston in its retracted or starting position within the cylinder;

FIGURE 2 is a similar but fragmentary section showing the piston extended and with the cam stop in effective position to limit further outward travel of the piston;

FIGURE 3 is a transverse section through the device taken along the line 3—3 of FIGURE 1; and FIGURE 4 is a transverse section taken along the line 4—4 of FIGURE 2.

DETAILED DESCRIPTION

While the invention has been shown and described herein as being embodied in a hydraulic ram device of a particular construction wherein the piston is extendable from the bore of the cylinder body for applying force through use of pressurized hydraulic fluid, it is not intended or desired to unnecessarily restrict the invention by reason of such specific embodiment since the improvements may be used to advantage in other types of fluid actuated power units embodying a reciprocating piston. It is also contemplated that certain descriptive terminology used herein be given the broadest possible interpretation consistent with the disclosure.

Referring to the accompanying drawing, the typical hydraulic power unit shown therein as embodying the invention is one which is commonly referred to as a single acting ram. This device comprises a cylinder body 10 having a bore 12 extending through one end thereof coaxially of the cylindrical body. The bore 12 terminates at its inner end in a reduced portion 14, and the body 10 is provided with a fluid passageway or port 16 communicating with the reduced portion 14 of the bore. The passageway 16 is adapted to receive a suitable fitting 18 as by means of screw threads, and this fitting is connected to a suitable source of supply for hydraulic fluid under pressure and under the control of an operator for energizing the ram. It is to be noted that the reduced portion 14 also forms a shoulder 20 at the end of the larger diameter portion of the bore 12.

Confined within the bore 12 of the cylinder 10 is a piston or plunger 22 which extends into the bore through the open end thereof. The piston 22 is snugly but slidably received within the bore 12 for reciprocation therein as will hereinafter more fully appear. The inner end of the piston 22 is of somewhat reduced diameter as at 24, and this reduced end 24 of the piston is adapted to abut or seat against the shoulder 20 adjacent the reduced portion 14 of the bore when the piston is fully retracted within the cylindrical body 10 as shown in FIGURE 1. The reduced end portion 24 of the piston is also adapted to receive a suitable seal or packing shown herein as being in the form of an annular sealing ring 26 of generally U-shaped cross section retained in position on the reduced portion 24 of the piston as by means of a washer 28 and a split ring 30.

The outer end of the piston 22 is exposed through the open end of the bore 12, and the exposed end of the piston 22 may be provided with suitable means for interchangeably receiving selected work-engaging or work-performing members such as, for example, a work-engaging saddle 32, as shown in FIGURE 1. The work-engaging member 32 may be removably retained within an end recess 34 in the piston 22, and any suitable means may be provided for retaining the same in position while permitting ready removal for reception of other selected work-engaging members.

In the single acting ram embodiment shown herein, the piston 22 is formed with a coaxial recess or bore 36 extending into the inner end thereof, and a return spring 38 is housed within this recess 36. The return spring 38 may be suitably secured at its inner end to the piston 22 as by means of a bolt or machine screw 40 and keeper 42. The opposite outer end of the spring 38 may, in turn, be suitably secured to the cylinder 10 at the inner end of the bore 12 thereof as by means of a machine screw or bolt 44 shown as being located within the reduced portion 14 of the cylinder bore.

With the parts thus assembled, it is apparent that the piston 22 is constantly acted upon by the spring 38 to urge the same toward its seated position within the bore 12 of the hollow cylinder 10 as shown in FIGURE 1. However, when pressurized fluid is admitted under the control of an operator through the port 16 and into the reduced portion 14 of the cylinder bore, the piston 22 is acted upon by the pressurized fluid and is forced outwardly toward the position shown in FIGURE 2. Upon de-energization, the piston 22 is again returned to its retracted position within the cylinder 10.

In accordance with the present invention, a positive stop is provided for limiting outward travel or excursion of the piston 22 while still permitting the piston to be of constant uniform outside diameter throughout its length, except, of course, for the reduced inner end portion 24 thereof. This permits the piston 22 to have a snug sliding fit with the bore 12 of the cylinder 10 throughout its entire length so as to provide an effective linear bearing instead of the customary spaced apart bearings. This provides an extremely durable assemblage which is relatively unaffected by imposition of eccentric loads on the unit.

As shown, the usual stop ring at the outer end of the cylinder bore is eliminated, and the bore 12 is provided with an annular inwardly open groove 50 having a gradually inclined entry surface 52. The inclined entry surface 52 extends toward the inner end of the bore 12 preferably at an angle of about fifteen degrees or less with respect to the annular surface of the bore, and the groove 50 is preferably placed in open communication with the exterior as by means of a pair of diametrically opposed ports or apertures 54. The annular groove 50 and inclined entry portion 52 accordingly provide a circumferential inwardly open cam surface adjacent the outer end of the cylinder bore 12 with the portion of the cam groove of greatest diameter or depth being vented and accessible to the exterior through ports 54 for purposes hereinafter described.

In turn, the piston 22 is formed with an annular outwardly open groove 58 adjacent its inner reduced end portion, and the two halves of a split ring 60 are received within this groove 58. The groove 58 and split ring 60 are of approximately the same depth and width with sufficient clearance being provided for free movement of the ring halves as hereinafter described. Each half of the split ring 60 is also formed with an inwardly open bore 62 intermediate the ends thereof, and a spring 64 is compressed within each of these bores. It should further be noted that the outer periphery of the split ring 60 is formed with a plane circumferential surface portion 66 corresponding to that of the cylinder bore 12 and mating with the annular recess 50, and with an adjacent, inclined portion 68 mating with the entry portion 52 of the recess. Thus, the outer periphery of the split ring 60 has a cam surface 66, 68 corresponding to the circumferential cam recess 50, 52 in the cylinder bore, and as the piston 22 is extended by fluid pressure to the position shown in FIGURE 2, the two halves of the split ring 60 are automatically forced into the cam groove or recess 50, 52 by the springs 64. Further extension of the piston 22 is thereby positively stopped, and upon release of the pressure from the displacement chamber or bore 12, the heavy spring 38 automatically retracts the piston with the mating cam surfaces 52 and 68 permitting the split ring 60 to return to its nested position within the annular groove 58. If it becomes desirable or necessary to remove the piston, it need merely be extended to position the split ring 60 in the cam groove 50, 52, and upon insertion of a key or pin through each of the openings 54, the arcuate sections of the ring 60 will be forced into the piston groove 58 so that the piston 22 may be readily withdrawn.

Various modes of carrying out the invention are contemplated as being within the scope of the following claims particularly pointing out and distinctly claiming the subject matter which is regarded as the invention.

I claim:

1. A fluid actuated power unit comprising, a cylinder having a bore extending through an end thereof, said cylinder having an inwardly open circumferential cam groove surrounding the bore adjacent its open end, a piston slidably received within the bore of said cylinder through the open end thereof, said piston having an annular recess exposed to the bore wall, a split ring having arcuate sections confined within the annular recess of said piston, said cam groove having a gradually inclined entry surface for permitting smooth movement of said arcuate sections into and out of said cam groove, radially disposed spring means for constantly urging the sections of said split ring outwardly of the annular recess and toward the wall of the cylinder bore, said sections having an outer face with the same configuration as the internal shape of the cam groove, and means for reciprocating said piston toward and away from extended condition to cause said split ring sections to ride along the cylinder bore wall and into and out of the cam groove, whereby said split ring sections and the cam groove cooperate to provide a stop for limiting travel of said piston.

2. A fluid actuated power unit according to claim 1, wherein the cylinder is formed with ports communicating the circumferential cam groove with the exterior.

3. A fluid actuated power unit according to claim 1, wherein each of the split ring sections carries a spring intermediate the ends thereof and seated against the inner wall of the piston recess to provide the means for urging the split ring sections outwardly.

4. A fluid actuated power unit according to claim 1, wherein the piston is of uniform diameter throughout substantially its entire length and the cylinder bore is of approximately the same uniform diameter to thereby provide an extensive bearing surface for said piston in its movement.

5. A fluid actuated power unit according to claim 4, wherein the extreme inner end of the piston is of reduced diameter, and an annular sealing ring is mounted on and carried by said reduced diameter portion of the piston.

6. A fluid actuated power unit according to claim 5, wherein the annular recess for receiving the split ring sections is formed in the piston adjacent the reduced end portion thereof.

References Cited

UNITED STATES PATENTS

| | | | |
|---|---|---|---|
| 1,827,966 | 10/1931 | Bristol | 92—23 XR |
| 1,892,540 | 12/1932 | Gartin | 92—30 |
| 2,724,368 | 11/1955 | Miller | 92—128 |
| 2,768,610 | 10/1956 | Lesier | 92—132 XR |
| 2,997,026 | 8/1961 | Zimmerer | 92—128 |
| 3,050,943 | 8/1962 | Thorel et al. | 92—23 XR |
| 3,166,990 | 1/1965 | Hoffmann | 92—168 XR |
| 3,396,637 | 8/1968 | Sessbody | 92—132 XR |
| 3,397,617 | 8/1968 | Cast et al. | 92—30 XR |
| 3,398,492 | 8/1968 | Nansel | 92—23 |

FOREIGN PATENTS 185,640    5/1956    Austria.

MARTIN P. SCHWADRON, Primary Examiner

LESLIE J. PAYNE, Assistant Examiner

U.S. Cl. X.R.

92—132, 165